Jan. 19, 1965 B. L. DAVIS 3,166,090
ACCELERATION CONTROL SYSTEM FOR A VEHICLE
Filed May 7, 1962 2 Sheets-Sheet 1

INVENTOR.
BELFORD L. DAVIS
BY
Baldwin & Martin
ATTORNEYS

Jan. 19, 1965  B. L. DAVIS  3,166,090
ACCELERATION CONTROL SYSTEM FOR A VEHICLE
Filed May 7, 1962  2 Sheets-Sheet 2

INVENTOR.
BELFORD L. DAVIS
BY
Baldwin & Martin
ATTORNEYS

United States Patent Office 3,166,090
Patented Jan. 19, 1965

3,166,090
ACCELERATION CONTROL SYSTEM FOR A VEHICLE
Belford L. Davis, 4428 Worth Drive W.,
Jacksonville, Fla.
Filed May 7, 1962, Ser. No. 192,634
12 Claims. (Cl. 137—353)

This invention relates to control systems and more particularly to an acceleration control system for a vehicle.

A general object of the present invention is to provide an improved acceleration control system for a vehicle.

A specific object is the provision of a selectively controllable system which is operative to prevent fast take-off or quick acceleration of the vehicle.

Another specific object of the invention is to avoid damage to and the excessive wear of the parts of vehicles otherwise resulting from the quick acceleration thereof.

A particular object is the provision of an improved system which may be installed in a vehicle by adding a minimum number of components with only minor modifications of the vehicle.

Another particular object of the invention is to provide an improved acceleration control system which is simple, inexpensive and compact in construction and which is readily installed in any type of motor vehicle and which is easily and efficiently cleaned and maintained.

An additional object of the present invention is to provide an improved system wherein the owner or driver of the vehicle may conveniently operate the system from within the passenger compartment of the vehicle and thereafter may safely lock the system to prevent tampering thereof by a person to whom the owner or driver may entrust with the vehicle.

The novel features which are believed to be characteristic of this invention are set forth with particularity in the appended claims. The invention itself, however, both as to its organization and method of operation, together with further objects and advantages thereof may best be understood by reference to the following description taken in connection with the accompanying drawings, in which:

Figure 1:
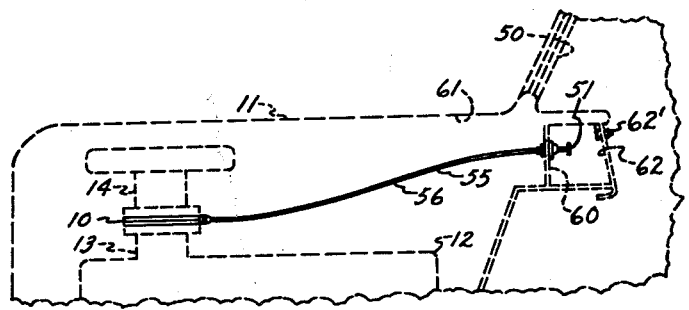
FIGURE 1 is a side elevational view of the acceleration control system for a vehicle in accordance with one embodiment of the invention, only part of the vehicle being shown by the broken lines.

Referring more particularly to the drawings of FIGURES 1, 2, 3 and 4, an acceleration control system is generally depicted at 10 installed in a vehicle 11, vehicle 11 including an internal combustion engine 12 having an intake manifold 13 and a downdraft carburetor 14, all shown by broken lines. The control system 10 comprises an elongated housing 15 having a pair of mating substantially flat shell members 16 and 17 and a plate 18 removably mounted to members 16 and 17. The top shell member 16 is provided with a pair of passageways 19 extending transversely through member 16, and the bottom shell member 17 includes a pair of passageways 20 and 21, passageways 20 and 21 being adapted to register with respective passageways 19 in the member 16. The passageways 19, 20 and 21 in shell members 16 and 17 are adapted to match comparable vacuum passageways, not shown, communicating between the carburetor 14 and intake manifold 13 through which the gas and air mixture passes in the well known manner. It is also well known that internal combustion engines used in vehicles pass the gas and air mixture from the carburetor 14 through vacuum passageways into intake manifold 13 ordinarily under a vacuum or reduced pressure due to the suction of the mixture created in the combustion chambers by the pistons (not shown) of the engine 12.

The housing 15 in accordance with one embodiment of the invention is mounted between carburetor 14 and manifold 13 by the usual lugs 23 which mount the carburetor to the manifold. Many manifolds are provided with heat vents 24 which communicate with the carburetor and provides quick warm up of the carburetor.

A gasket seal 25 is provided between shell members 16 and 17 to completely vacuum seal the members together. End plate 18 is removably mounted to the ends 26 and 27 of shell members 16 and 17 by screws 28. It is to be understood that a liquid or paste sealer is normally applied on the inner face 29 of plate 18 before plate 18 is joined to members 16 and 17. A control valve chamber 30 is defined between shell members 16 and 17, and chamber 30 is seen to include respective element chambers 30' and 30''. Chamber 30 has a rearward limit defined by removable plate 18, and a substantially flat control valve 32 is supported within valve chamber 30, control valve 32 including a pair of elements or flanges 33 and 34 respectively within element chambers 30' and 30''.

Chambers 30' and 30'' respectively consist of forward portions 35 and 36 connecting with passageways 20 and 21 which in turn are connected to and are aligned with the vacuum passageways in the engine manifold. Rear portions 36 and 37 of respective chambers 30' and 30'' extend laterally of passageways 20 and 21. When the control valve 32 with its elements 33 and 34 positioned in the forward portions 35 and 36 of chambers 30' and 30'', the control valve 32 substantially constricts passageways 20 and 21 thereby constricting or reducing the rate of flow of the gas and air mixture from the carburetor 14 into the manifold 13 as more fully described hereinbelow.

End plate 18 is provided with a passage 40 communicating within chamber 30 and opening exteriorly of housing 15. A connector 41 is nested within passage 40 and secured to plate 18 in vacuum sealing relation. An elongated wire or rod 43 passes through passage 40 and connector 41 and is connected at end 44 to control valve 32. The other end 45 of wire 43 extends within the passenger compartment 50 and a control means in the form of handle 51 is attached thereto.

Sealing means, generally depicted at 55, is positioned between the wire 43 and plate 18 for vacuum sealing passage 40 to wire 43. Sealing means 55 specifically includes a conduit 56 surrounding wire 43 and connected at end 57 by coupler 58 to connector 41. The other end 59 of conduit 56 is connected to a stationary portion or wall 60 between the passenger compartment 50 and engine compartment 61 of vehicle 11, wall 60 being specifically shown as the rear wall of glove compartment 62. Connector 63 firmly secures conduit 56 in fixed relation to wall 60, and a packing gland (not shown) is supported within connector 63 to vacuum seal the conduit 56 to wire 43.

It is to be noted that the packing gland is spacedly removed from the housing 15 and from intake manifold 13 and is preferably located at the connector 63 adjacent wall 60, thereby substantially preventing heat damage of the gland. To insure sealing of the passage 40 another gland may be provided within conduit 56 adjacent connector 41.

Figure 2:
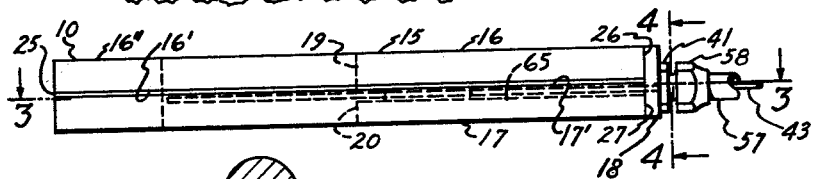
FIGURE 2 is an enlarged side elevational view of the housing portion of the system shown in FIGURE 1.

By a close inspection of FIGURE 2, the top member 16 is preferably planar on both faces 16′ and 16″ and the control valve 32 is nested within the channel cavity 65 preformed in face 17′ of bottom member 17. If bottom member 17 were planar on both faces, including face 17′, the gasket 25 shown in FIGURE 2 must by necessity be sufficiently thick to provide a cavity between faces 16′ and 17′ of members 16 and 17 in which the control valve 32 is slidably disposed. Such a construction, as forming the cavity 65 in face 17, permits a thin gasket, or a liquid or paste sealer, previously mentioned with respect to end plate 18, to be disposed between the plate members 16 and 17 for vacuum sealing thereof.

The end plate 18 is preferably removably mounted to members 16 and 17 for readily cleaning or replacement of the control valve 32 without removal of the carburetor 14 and top plate 16 of housing 15, which may, if desired be removed.

The invention may be more easily understood by reference to the following description of the operation of the acceleration control system 10 of FIGURES 1, 2, 3 and 4. Assuming that the owner or driver desired to control the acceleration of vehicle 11, while he is driving the vehicle or before entrusting same to another, the owner would merely unlock the glove compartment 62, push the handle 51 which would operate the control valve 32 to slide within chamber 30 to substantially constrict the passageways 20 and 21 thereby restricting the vacuum passageways normally unobstructed between the carburetor 14 and manifold 13 through which the gas and air mixture normally passes. This constriction of the passageways reduces the rate of flow of the mixture and thereby reduces the acceleration of the vehicle. The vehicle therefore is unable to "scratch-off" or quickly accelerate, and regardless of the degree of depressing the accelerator pedal, the vehicle is capable of only gradual acceleration. The acceleration control system will also limit the speed of the vehicle in that the maximum volume of mixture passable through the constricted passageways at a high speed, for example 60 m.p.h., or at a high partial vacuum, is reduced.

When it is desired to operate the vehicle with full acceleration and power, the handle 51 is pulled which moves wire 43 and control valve 32 rearwardly to remove the obstruction or constriction from passageways 20 and 21.

The lock normally associated with the glove compartment 62 may be replaced by a new lock 62′ so that the key used for operating the vehicle will not open the lock 62′. Therefore, the vehicle 11 can be entrusted to a friend or children with confidence that the vehicle will not be recklessly driven due to the limitation of the acceleration thereof.

Figure 5:
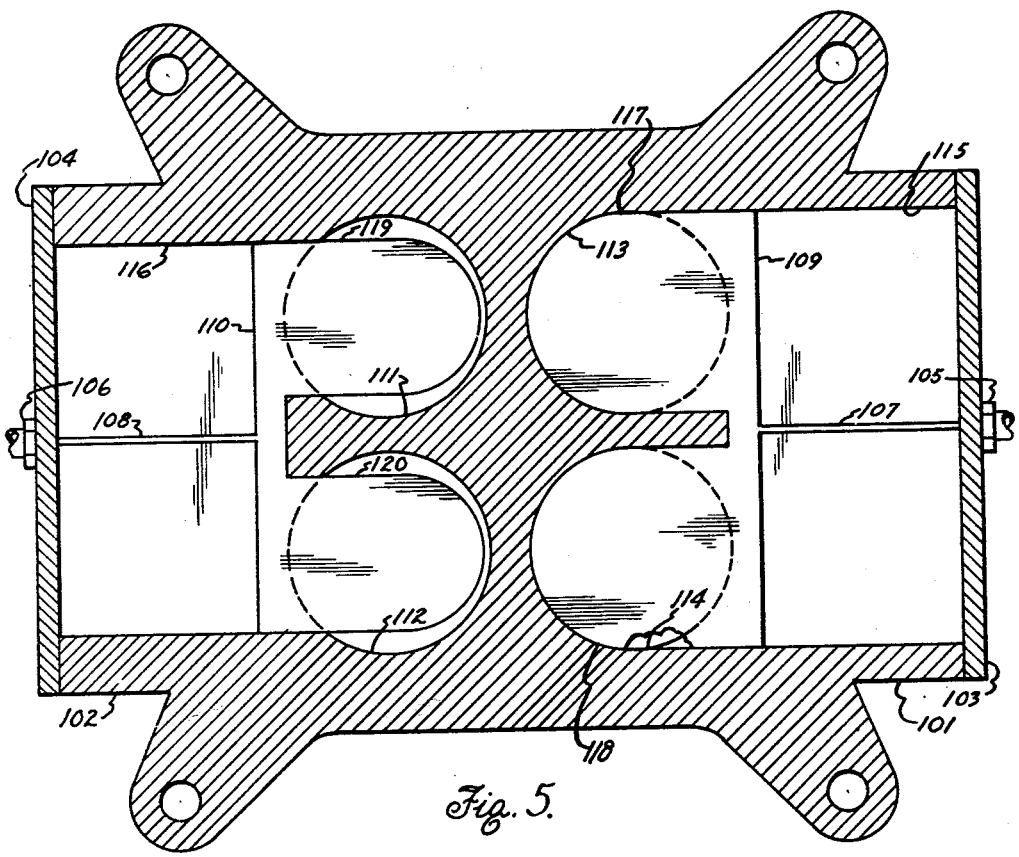
FIGURE 5 is a modified embodiment of the invention for attachment to a vehicle having a four-barrel carburetor.
Figure 6:
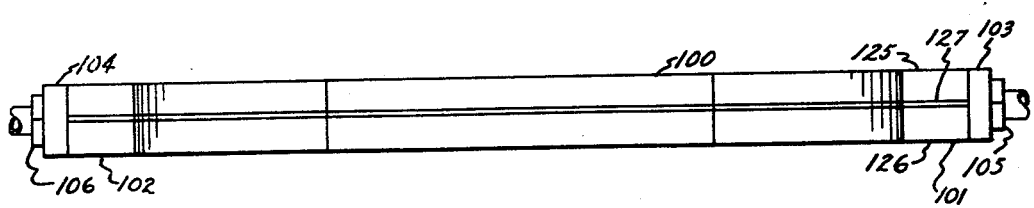
FIGURE 6 is a side elevation of the housing portion of FIGURE 5, substantially similar to the housing portion shown in FIGURE 2.

An acceleration control system in accordance with another embodiment of the invention for a four-barrel carburetor is partially shown in FIGURES 5 and 6. The system includes a pair of sealing means and control means, substantially identical to sealing means 55 and control means 51 shown in FIGURE 3, which are associated with each end 101 and 102 of housing 100. End plates 103 and 104 are removably mounted and support respective connectors 105 and 106 through which respective wires 107 and 108 extend, wires 107 and 108 being secured to control valves 109 and 110 inwardly of housing 100.

The primary passageways through which the gas and air mixture passes from the carburetor to the manifold are designated through the housing 100 at 111 and 112. The secondary passageways are designated at 113 and 114 and these passageways are normally maintained blocked by throttle plates within the carburetor which are automatically opened to supplement the primary passageways when the capacity thereof is exceeded in the well known manner.

Figure 3:
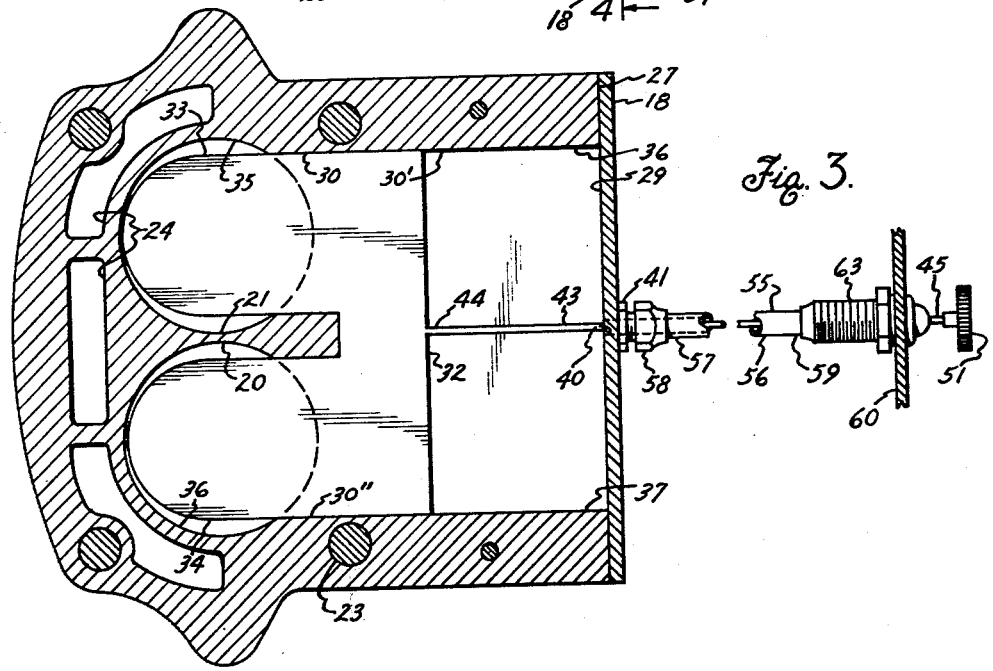
FIGURE 3 is a sectional view taken along line 3—3 of FIGURE 2, including details of the operating control of the system shown in FIGURE 1.
Figure 4:
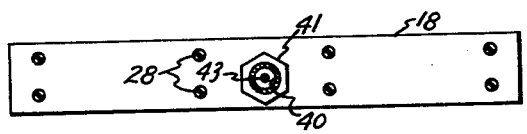
FIGURE 4 is a sectional view taken along line 4—4 of FIGURE 2.

Control valve 109 is slidingly supported within chamber 115 and control valve 110 is similarly disposed within chamber 116 in a substantially identical manner as the previously described control valve 32 in FIGURE 3. The valve elements or flanges 117 and 118 substantially completely constrict passageways 113 and 114, when the control valve 109 is in the position shown, to prevent the automatic opening of the secondary passageways mentioned above.

The primary passageways 111 and 112 are substantially constricted by elements 119 and 120 when control valve 110 assumes the position shown in FIGURE 5. Upon withdrawal of wires 107 and 108 by respective control means or handle positioned within the passenger compartment of the vehicle, the respective control valves 109 and 110 are pulled into an inoperative position in chambers 115 and 116. The operation and functions of the acceleration control system for a four-barrel carburetor are substantially identical to the system 10 described above except for the complete constriction or obstruction of the secondary passageways 113 and 114 by control valve 109.

The housing 100, as shown in FIGURE 6, comprises a pair of mating shell members 125 and 126 with a gasket 127 sandwiched therebetween in substantially the same manner as housing 15 in FIGURE 2. The end plates 103 and 104 are mounted to members 125 and 126 identical to end plates 18 in FIGURES 2, 3, and 4.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. An acceleration control system for a vehicle wherein said vehicle includes an internal combustion engine having an intake manifold and a downdraft carburetor communicating with said manifold through a vacuum passageway, said system comprising a housing mounted between said manifold and said carburetor, said housing having a chamber therein with a forward portion of said chamber in communication with said vacuum passageway and its rearward portion extending rearwardly and laterally thereof, said housing having a passage communicating within said rearward portion of said chamber and opening exteriorly of said housing, a valve element slidingly supported within said chamber, said valve element being movable from an inoperative position in said chamber rearward portion to an operative position in said chamber forward portion, an elongated wire having one end portion extending through said passage and attached to said valve element and the other end portion terminating exteriorly of said housing, sealing means between said elongated wire and said housing for vacuum sealing said passage, and selective control means attached to said other end of said wire for sliding said valve element from said inoperative position forwardly to said operative position, said valve element having an end portion which extends over said passageway and partially obstructs same when said valve element is positioned in its said operative position, said valve element end portion being adapted to substantially constrict said vacuum passageway whereby the rate of flow of the gas and air mixture is reduced and the acceleration of the vehicle is selectively controllable.

2. An acceleration control system for a vehicle wherein said vehicle includes an internal combustion engine having an intake manifold and a downdraft carburetor communicating with said manifold through a plurality of vacuum passageways, said system comprising a housing mounted between said manifold and said carburetor, said housing having a plurality of chambers therein, each of said chambers having a forward portion in communication with one of said vacuum passageways and its rearward portion extending rearwardly and laterally thereof, said rearward portions of said chambers being in communication, said housing having a passage communicating within at least one said rearward portion of said chambers and opening exteriorly of said housing, a control valve disposed within said housing in said rearward portions of said chambers and including a laterally extending element slidingly supported within each said chamber, respective said valve element being movable from an inoperative position in each said chamber rearward portion to an operative position in each said chamber forward portion, an elongated wire having one end portion extending through said passage and attached to said control valve and the other end portion terminating exteriorly of said housing, sealing means between said elongated wire and said housing for vacuum sealing said passage, and selective control means attached to said other end of said wire for positioning said control valve, said control means sliding each said element of said control valve from said inoperative position forwardly to said operative position, each said valve element having an end portion adapted to extend over respective said passageway and partially obstruct same when said respective valve element is positioned in its said operative position, respective said valve element end portion being adapted to substantially constrict said vacuum passageways whereby the rate of flow of the gas and air mixture from the carburetor is reduced and the acceleration of the vehicle is selectively controllable.

3. An acceleration control system for a vehicle wherein said vehicle includes an internal combustion engine having an intake manifold and a downdraft carburetor communicating with said manifold through a vacuum passageway, said system comprising a housing mounted between said manifold and said carburetor, said housing having a chamber therein communicating with said vacuum passageway and extending rearwardly thereof, said housing having a passage communicating within said chamber and opening exteriorly of said housing, a valve element movably supported within said chamber from an inoperative rearward position to an operative forward position, an elongated rod member having one end portion extending through said passage and attached to said valve element and the other end portion terminating exteriorly of said housing, sealing means between said rod member and said housing for vacuum sealing said passage, and selective control means attached to said other end portion of said rod member for moving said valve element from an inoperative rearward position within said chamber forwardly to an operative forward position therewithin, said valve element having an end portion of a predetermined size less than the size of said vacuum passageway, said valve element end portion partially obstructing said vacuum passageway when said valve element is positioned in its said operative forward position to substantially constrict said vacuum passageway whereby the acceleration of the vehicle is selectively controllable.

4. An acceleration control system for a vehicle wherein said vehicle includes an internal combustion engine having an intake manifold and a downdraft carburetor communicating with said manifold through a vacuum passageway, said system comprising a housing mounted between said manifold and said carburetor in vacuum sealing arrangement, said housing including a pair of substantially flat shell members, each having a mating face, one said mating face having an open ended channel cavity therein, said mating faces of said shell members being contiguous whereby the other face covers and extends across said channel cavity, a plate removably mounted to said shell members, for closing the open end of said channel cavity thereby defining a chamber with a forward portion of said chamber in communication with said vacuum passageway and its rearward portion extending laterally and rearwardly thereof, said plate being provided with a passage communicating within said rearward portion of said chamber and openingly exteriorly of said housing, a substantially flat valve element slidingly supported within said chamber, an elongated rod having one end portion extending through said passage and attached to said valve element and the other end portion terminating exteriorly of said housing, sealing means between said rod and said plate for vacuum sealing said passage, and selective control means attached to said other end portion of said rod for sliding said valve element from an inoperative position in said rearward portion of said chamber, forwardly to an operative position in said forward portion, said valve element having an end portion extending over said vacuum passageway when said valve element is positioned in its said operative position to substantially constrict said vacuum passageway whereby the acceleration of the vehicle is selectively controllable.

5. An acceleration control system attachment for a vehicle having an engine intake manifold communicating with a downdraft carburetor by a vacuum passageway, said attachment comprising a housing having a pair of substantially flat shell members oppositely facing and connected to each other, a plate extending laterally of each of said flat shell members and removably mounted thereto, said shell members and plate defining a chamber, each said shell member having a transversely extending passageway, said passageway in each said shell member being in alignment and adapted to align with said vacuum passageway when said shell members are mounted between said manifold and carburetor, said plate being provided with a passage communicating with said chamber rearwardly of said passageways and opening exteriorly of said housing, a substantially flat valve element slidingly supported within said chamber, an elongated wire having one end portion extending through said passage and attached to said valve element and the other end portion terminating exteriorly of said housing, sealing means between said wire and said plate for vacuum sealing said passage, and selective control means attached to said other end portion of said wire, said control means being operable from within the passenger compartment of the vehicle, said control means sliding said valve element from an inoperative position within said chamber forwardly into an operative position therein, said valve element having an end portion extending over said transversely extending passageways and partially obstructing same when said valve element is positioned in its said operative position to substantially constrict said transversely extending passageways and said vacuum passageway whereby the acceleration of the vehicle is selectively controllable.

6. An acceleration control system for a vehicle having an engine intake manifold communicating with a downdraft carburetor by a vacuum passageway comprising a housing having a pair of flat mating shell members defining a valve element chamber therebetween, said housing having a plate removably mounted to said shell members, said plate being provided with a passage communicating within said chamber and opening exteriorly of said housing, each said shell member being provided with a transversely extending passageway in alignment and communicating with said chamber, said housing being mounted between said intake manifold and said carburetor with each said transversely extending passageway in alignment with said vacuum passageway, a flat valve element movably supported within said chamber, an elongated wire having one end portion extending through said passage and attached to said valve element and the other end portion terminating exteriorly of said housing, selective control means attached to said other end portion of said wire, said control means being positioned within the passenger compartment of said vehicle and operable therefrom, an elongated conduit surrounding said wire and having one end attached to said plate and the other end thereof attached to a stationary portion of said vehicle between the engine and passenger compartments, sealing means between said conduit and wire for vacuum sealing said passage, said control means operable to move said wire and for forwardly moving said valve element from an inoperative position within said chamber rearwardly of said transversely extending passageways into an operative position therein, said valve element having an end portion extending over said transversely extending passageways and partially obstructing same when said valve element is positioned in said operative position to substantially constrict said transversely extending passageways and vacuum passageway whereby the rate of flow of the gas and air mixture through said vacuum passageway into said intake manifold is reduced to selectively control the acceleration of the vehicle.

7. An acceleration control system for a vehicle wherein said vehicle includes an internal combustion engine having an intake manifold and a downdraft carburetor communicating with said manifold through a vacuum passageway, said system comprising an elongated housing mounted between said manifold and said carburetor, said housing having an elongated chamber therein with one portion of said chamber in contact with said vacuum passageway and its other portion extending laterally and rearwardly thereof, said housing having a passage communicating within said other portion of said chamber and opening exteriorly of said housing, a valve element slidingly supported within said chamber and having an end portion adapted and arranged to be selectively positioned partially over said vacuum passageway, an elongated wire having one end portion extending through said passage and attached to said valve element and the other end portion terminating exteriorly of said housing, a conduit surrounding said wire and having one end attached to said housing and its other end connected to a wall portion of the vehicle between the engine and passenger compartments, sealing means between said wire and said conduit removed from said housing for vacuum sealing said passage, and a control handle attached to said other end of said wire and operable from the passenger compartment for selectively moving said wire and sliding said valve element forwardly from an inoperative position in said other portion of said chamber to an operative position in said one portion of said chamber to substantially constrict said vacuum passageway with said valve end portion whereby the rate of flow of the gas and air mixture into said manifold is selectively reduced.

8. An acceleration control system for a vehicle wherein said vehicle includes an internal combustion engine having an intake manifold and a downdraft carburetor communicating with said manifold through a plurality of vacuum passageways, said system comprising a housing mounted between said manifold and said carburetor, said housing having a plurality of chambers therein, each of said chambers having one portion in contact with respective said vacuum passageways and its other portion extending laterally and rearwardly thereof, said other portions of said chambers being in communication, said housing having a passage communicating within at least one said other portion of said chambers and opening exteriorly of said housing, a control valve disposed within said housing in said other portions of said chambers including a laterally extending element slidingly supported within each said chamber and having an end portion adapted and arranged to be selectively positioned partially over respective said vacuum passageway, an elongated wire having one end portion extending through said passage and attached to said control valve and the other end portion terminating exteriorly of said housing, a conduit surrounding said wire and having one end attached to said housing, sealing means between said wire and said conduit removed from said housing for vacuum sealing said passage, and selective control means attached to said other end of said wire for moving said wire and positioning said control valve within said chambers, said control means when moving said wire sliding each said element of said control valve from an inoperative position in said other portion of each said chamber forwardly to an operative position in said one portion of each said chamber to substantially constrict said vacuum passageways by said valve end portions whereby the rate of flow of the gas and air mixture into said manifold is selectively reduced.

9. An acceleration control system for a vehicle wherein said vehicle includes an internal combustion engine having an intake manifold and a downdraft carburetor communicating with said manifold through a vacuum passageway, said system comprising a housing mounted between said manifold and said carburetor in vacuum sealing arrangement, said housing including a pair of substantially flat shell members, a plate removably mounted to adjacent rearward ends of said shell members, said shell members and plate defining a chamber with one portion of said chamber in contact with said vacuum passageway and its other portion extending rearwardly and laterally thereof, said plate being provided with a passage communicating within said other portion of said chamber and opening exteriorly of said housing, a substantially flat valve element slidingly supported with said chamber, an elongated wire having one end portion extending through said pasasge and attached to said valve element and the other end portion terminating exteriorly of said housing, an elongated conduit surrounding said wire and having one of its ends sealed to said plate and its other end connected to the wall between the engine and passenger compartments, sealing means between said other end of said conduit and said other end portion of said wire for vacuum sealing said passage, and a control handle attached to said other end portion of said conduit within the passenger compartment for sliding said valve element from an inoperative position in said other portion of said chamber forwardly to an operative position in said one portion, said valve element having an end portion which extends over said vacuum passageway and partially obstructs same when said valve element is positioned in said operative position, said valve element end portion being adapted to substantially constrict said vacuum passageway thereby reducing the rate of flow of the gas and air mixture into the said manifold.

10. An acceleration control system for a vehicle wherein said vehicle includes an internal combustion engine having an intake manifold and a downdraft carburetor communicating with said manifold through four vacuum passageways, said system comprising a housing mounted between said manifold and said carburetor, said housing having four chambers therein respectively communicating with one of said vacuum passageways, said housing having a pair of passages each communicating within a pair of said chambers and opening exteriorly of said housing, a pair of control valves respectively including a laterally extending element slidingly supported within each said chamber, one said element having an end portion adapted and arranged to be selectively positioned partially over two of said vacuum passageways, the other said element having an end portion adapted and arranged to be selectively positioned completely over the other two said vacuum passageways, a pair of elongated wires respectively having one end portion extending through one said passage and attached to respective said control valve and the other end portion terminating exteriorly of said housing, sealing means between each said wire and said housing for vacuum sealing each said passage, and a pair of selective control means attached to respective said other end portion of each said wire, one of said control means sliding each said element of one said control valve from an inoperative position to substantially constrict said two vacuum passageways by said one element end portion and the other of said control means sliding each said element of the other said control valve from an inoperative position to completely constrict said other two vacuum passageways by said other element end portion whereby the acceleration of the vehicle is selectively controllable.

11. An acceleration control system for a vehicle wherein said vehicle includes an internal combustion engine having an intake manifold and a downdraft carburetor communicating with said manifold through a pair of primary vacuum passageways and a pair of secondary vacuum passageways, said system comprising a housing mounted between said manifold and said carburetor, said housing including one chamber communicating with said primary vacuum passageways and a second chamber communicating with said secondary vacuum passageways, said housing having a passage communicating within each said first and second chambers and opening exteriorly of said housing, a control valve slidingly supported within each said first and second chambers, a pair of elongated wires respectively having one end portion extending through each said passage and attached to each said control valve and the other end portion terminating exteriorly of said housing, sealing means between each said wire and said housing for vacuum sealing said passage, and a selective control means attached to each said other end portion of said wire for moving the attached said control valve, one of said control means sliding said control valve within said one chamber from an inoperative position to an operative position, said control valve in said first chamber having an end portion extending over said primary vacuum passageways and partially obstructing same when said control valve is in its said operative position to substantially constrict said primary vacuum passageways, and the other control means sliding said control valve within said second chamber from an inoperative position to an operative position, said control valve in said second chamber having an end portion extending over said secondary vacuum passageways and completely obstructing same when said control valve is in its said operative position to completely constrict said secondary passageways whereby the rate of flow of the gas and air mixture into said manifold is selectively controllable.

12. An acceleration control system for a vehicle wherein said vehicle includes an internal combustion engine having an intake manifold and a carburetor communicating with said manifold through a pair of primary vacuum passageways and a pair of secondary vacuum passageways, said system comprising a housing mounted between said manifold and said carburetor, said housing including chamber means communicating with said pair of primary passageways and said pair of secondary passageways, control valve means slidingly supported within said chamber means, elongated wire means connected to said control valve means and extending outwardly through said housing, sealing means between said wire means and said housing for vacuum sealing thereof, selective control means attached to said wire means exteriorly of said housing for moving said control valve means, said selective control means sliding said control valve means within said chamber means from an inoperative position to an operative position therewithin, said control valve means having an end portion extending over said primary vacuum passageways and partially obstructing same when said control valve means is positioned in its said operative position to substantially constrict said primary vacuum passageways and to completely constrict said secondary passageways whereby the rate of flow of the gas and air mixture into said manifold is selectively controllable, said control valve means completely constricting said secondary passageways when said control valve means is positioned in its said operative position.

References Cited by the Examiner
UNITED STATES PATENTS

| 1,157,929 | 10/15 | Dugan et al. | 137—383 XR |
| 1,181,571 | 5/16 | Conley | 137—383 XR |
| 1,372,987 | 3/21 | Thomas | 251—294 XR |
| 1,400,615 | 12/21 | McCalmont | 137—383 XR |
| 1,537,411 | 5/25 | Cox et al. | 137—384.2 XR |

M. CARY NELSON, *Primary Examiner.*